US011296609B2

(12) United States Patent
Huang et al.

(10) Patent No.: US 11,296,609 B2
(45) Date of Patent: Apr. 5, 2022

(54) THREE-PHASE POWER APPARATUS WITH BIDIRECTIONAL POWER CONVERSION

(71) Applicant: DELTA ELECTRONICS, INC., Taoyuan (TW)

(72) Inventors: Wen-Lung Huang, Taoyuan (TW); Sheng-Hua Li, Taoyuan (TW)

(73) Assignee: DELTA ELECTRONICS, Taoyuan (TW)

(*) Notice: Subject to any disclaimer, the term of this patent is extended or adjusted under 35 U.S.C. 154(b) by 0 days.

(21) Appl. No.: 16/675,506

(22) Filed: Nov. 6, 2019

(65) Prior Publication Data

US 2021/0044210 A1 Feb. 11, 2021

(30) Foreign Application Priority Data

Aug. 6, 2019 (CN) .......................... 201910721749.8

(51) Int. Cl.
*H02M 3/335* (2006.01)
*H02M 7/219* (2006.01)
*H02M 3/158* (2006.01)
*H02J 7/00* (2006.01)
(Continued)

(52) U.S. Cl.
CPC ......... *H02M 3/33584* (2013.01); *B60L 50/66* (2019.02); *B60L 53/22* (2019.02);
(Continued)

(58) Field of Classification Search
CPC .. H02M 3/33584; H02M 7/219; H02M 3/158; H02M 1/4233; H02M 1/0058; H02M 1/007; H02M 7/487; H02M 3/1584; H02M 3/337; H02M 7/797; H02M 1/4216; H02M 1/12; H02M 3/155; H02J 7/00; H02J 7/022; H02J 2207/20; H02J 2310/48; H02J 7/02;
(Continued)

(56) References Cited

U.S. PATENT DOCUMENTS

2003/0080741 A1* 5/2003 LeRow ...................... H02J 3/38
324/320
2009/0303764 A1* 12/2009 Jin ...................... H02M 7/2173
363/87
(Continued)

FOREIGN PATENT DOCUMENTS

TW 201217811 A 5/2012
TW 201815042 A 4/2018

*Primary Examiner* — Toan T Vu
(74) *Attorney, Agent, or Firm* — Muncy, Geissler, Olds & Lowe, P.C.

(57) ABSTRACT

A three-phase power apparatus with bidirectional power conversion applied to charge a battery of an electric vehicle. The three-phase charging apparatus includes an AC-to-DC conversion unit, a first DC bus, a first DC-to-DC conversion unit, a second DC bus, and a second DC-to-DC conversion unit. The first DC bus is coupled to the AC-to-DC conversion unit. The first DC-to-DC conversion unit includes an isolated transformer, a resonant tank, a first bridge arm assembly, and a second bridge arm assembly. The first bridge arm assembly is coupled to the first DC bus and a primary side of the isolated transformer. The second bridge arm assembly is coupled a secondary side of the isolated transformer. The second DC bus is coupled to the second bridge arm assembly. The second DC-to-DC conversion unit is coupled to the second DC bus and the battery.

9 Claims, 3 Drawing Sheets

(51) Int. Cl.
*H02J 7/02* (2016.01)
*B60L 50/60* (2019.01)
*B60L 53/22* (2019.01)

(52) U.S. Cl.
CPC ............... *H02J 7/00* (2013.01); *H02J 7/022* (2013.01); *H02M 3/158* (2013.01); *H02M 7/219* (2013.01); *B60L 2210/12* (2013.01); *B60L 2210/14* (2013.01); *B60L 2210/30* (2013.01); *H02J 2207/20* (2020.01)

(58) Field of Classification Search
CPC ...... B60L 53/22; B60L 50/66; B60L 2210/12; B60L 2210/30; B60L 2210/14; B60L 2210/40; B60L 15/007; B60L 53/00; B60L 55/00; Y02T 90/14; Y02T 10/92; Y02T 10/7072; Y02T 10/70; Y02T 10/72; Y02T 10/64

USPC .... 307/9.1, 10.1, 91; 320/37, 107, 128, 137; 363/17, 41

See application file for complete search history.

(56) References Cited

U.S. PATENT DOCUMENTS

| | | | |
|---|---|---|---|
| 2015/0200597 A1* | 7/2015 | Kha | H02M 3/33592 363/17 |
| 2015/0333634 A1* | 11/2015 | Yoshida | H02M 3/3353 363/21.03 |
| 2015/0333637 A1* | 11/2015 | Izumi | H02M 7/219 363/21.01 |
| 2018/0037121 A1* | 2/2018 | Narla | B60L 11/1811 |
| 2018/0097441 A1 | 4/2018 | Chang et al. | |
| 2018/0152115 A1* | 5/2018 | Yan | H02M 3/158 |

* cited by examiner

THREE-PHASE POWER APPARATUS WITH BIDIRECTIONAL POWER CONVERSION

BACKGROUND

Technical Field

The present disclosure relates to a power apparatus, and more particularly to a three-phase power apparatus with bidirectional power conversion applied to electric vehicle charging.

Description of Related Art

The statements in this section merely provide background information related to the present disclosure and do not necessarily constitute prior art.

Energy conservation and carbon reduction have become a global consensus, and the major car manufacturers around the world are also actively developing plug-in hybrid electric vehicles and pure electric vehicles. Through the formulation of laws and energy policies, governments have encouraged car manufacturers to invest more research to promote industrial upgrading and promote the development of a green economy.

In addition to meeting the specifications of the major car manufacturers in the future, the new generation of electric vehicle charging equipment must be capable of both recharging battery and feeding energy back into the grid. Since the use of electric vehicles is increasing rapidly, the expansion of the charging equipment must take into account the overall grid architecture.

Therefore, how to design a three-phase power apparatus with bidirectional power conversion applied to electric vehicle charging to achieve the above technical goals is an important subject studied by the inventors of the present disclosure.

SUMMARY

An object of the present disclosure is to provide a three-phase power apparatus with bidirectional power conversion to achieve the above-mentioned technical goals.

In order to achieve the above-mentioned object, the three-phase power apparatus with bidirectional power conversion includes an AC-to-DC conversion unit, a first DC bus, a first DC-to-DC conversion unit, a second DC bus, and a second DC-to-DC conversion unit. The AC-to-DC conversion unit has a first bridge arm, a second bridge arm, and a third bridge arm, a first side of the AC-to-DC conversion unit is coupled to an AC mains. The first DC bus is coupled to a second side of the AC-to-DC conversion unit, and has a first DC voltage. The first DC-to-DC conversion unit includes an isolated transformer, a first bridge arm assembly, and a second bridge arm assembly. The isolated transformer has a primary side and a secondary side. The first bridge arm assembly is coupled to the first DC bus and the primary side, the first bridge arm assembly has a first bridge arm and a second bridge arm. The second bridge arm assembly is coupled to the secondary side, the second bridge arm assembly has a first bridge arm and a second bridge arm. The second DC bus is coupled to the second bridge arm of the second bridge arm assembly, and has a second DC voltage. A first side of the second DC-to-DC conversion unit is coupled to the second DC bus and a second side of the second DC-to-DC conversion unit is coupled to the battery. The primary side and/or the secondary side of the isolated transformer has a resonant tank, and the first DC-to-DC conversion unit is in an open-loop operation and operates at a resonant frequency point.

In one embodiment, the second DC-to-DC conversion unit is a non-isolated conversion circuit.

In one embodiment, the AC-to-DC conversion unit is a three-level converter; when a power flow direction of the three-phase power apparatus is from the AC mains to the battery, the AC-to-DC conversion unit provides a power factor correction for the AC mains and provides the stable first DC voltage.

In one embodiment, when a power flow direction of the three-phase power apparatus is from the battery to the AC mains, the AC-to-DC conversion unit is controlled in a three-level manner, and the AC-to-DC conversion unit operates in a current mode control.

In one embodiment, when a power flow direction of the three-phase power apparatus is from the AC mains to the battery, the second DC-to-DC conversion unit is controlled as a DC buck converter.

In one embodiment, when a power flow direction of the three-phase power apparatus is from the battery to the AC mains, the second DC-to-DC conversion unit is controlled as a DC boost converter.

In one embodiment, when a power flow direction of the three-phase power apparatus is delivered from the battery and in a standalone operation, the AC-to-DC conversion unit is controlled in a three-level manner, and the AC-to-DC conversion unit operates in a voltage mode control.

In one embodiment, the first bridge arm of the AC-to-DC conversion unit includes a first power switch, a second power switch connected to the first power switch in series, and a first diode coupled to a common contact connected between the first power switch and the second power switch, and includes a third power switch, a fourth power switch connected to the third power switch in series, and a second diode coupled to a common contact connected between the third power switch and the fourth power switch; the second power switch is coupled to the third power switch and commonly connected at a first contact, and the first diode is coupled to the second diode and commonly connected at a potential neutral point. The second bridge arm of the AC-to-DC conversion unit includes a fifth power switch, a sixth power switch connected to the fifth power switch in series, and a third diode coupled to a common contact connected between the fifth power switch and the sixth power switch, and includes a seventh power switch, an eighth power switch connected to the seventh power switch in series, and a fourth diode coupled to a common contact connected between the seventh power switch and the eighth power switch; the sixth power switch is coupled to the seventh power switch and commonly connected at a second contact, and the third diode is coupled to the fourth diode and commonly connected at the potential neutral point. The third bridge arm of the AC-to-DC conversion unit includes a ninth power switch, a tenth power switch connected to the ninth power switch in series, and a fifth diode coupled to a common contact connected between the ninth power switch and the tenth power switch, and includes an eleventh power switch, a twelfth power switch connected to the eleventh power switch in series, and a sixth diode coupled to a common contact connected between the eleventh power switch and the twelfth power switch; the tenth power switch is coupled to the eleventh power switch and commonly connected at a third contact, and the fifth diode is coupled to the sixth diode and commonly connected at the potential neutral point.

In one embodiment, the first bridge arm of the first bridge arm assembly of the first DC-to-DC conversion unit includes a first power switch and a second power switch connected to the first power switch in series, and the first power switch and the second power switch are commonly connected at a fourth contact. The second bridge arm of the first bridge arm assembly of the first DC-to-DC conversion unit includes a third power switch and a fourth power switch connected to the third power switch in series, and the third power switch and the fourth power switch are commonly connected at a fifth contact, wherein the fourth contact and the fifth contact are respectively coupled to two ends of the primary side. The first bridge arm of the second bridge arm assembly of the first DC-to-DC conversion unit includes a fifth power switch and a sixth power switch connected to the fifth power switch in series, and the fifth power switch and the sixth power switch are commonly connected at a sixth contact. The second bridge arm of the second bridge arm assembly of the first DC-to-DC conversion unit includes a seventh power switch and an eighth power switch connected to the seventh power switch in series, and the seventh power switch and the eighth power switch are commonly connected at a seventh contact, wherein the sixth contact and the seventh contact are respectively coupled to two ends of the secondary side.

In one embodiment, the first DC voltage or the second DC voltage are dynamically adjusted according to real-time conversion efficiency, component temperature, or battery voltage.

Accordingly, the three-phase power apparatus with bidirectional power conversion is provided to meet the requirements of a new generation of electric vehicle charging equipment.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
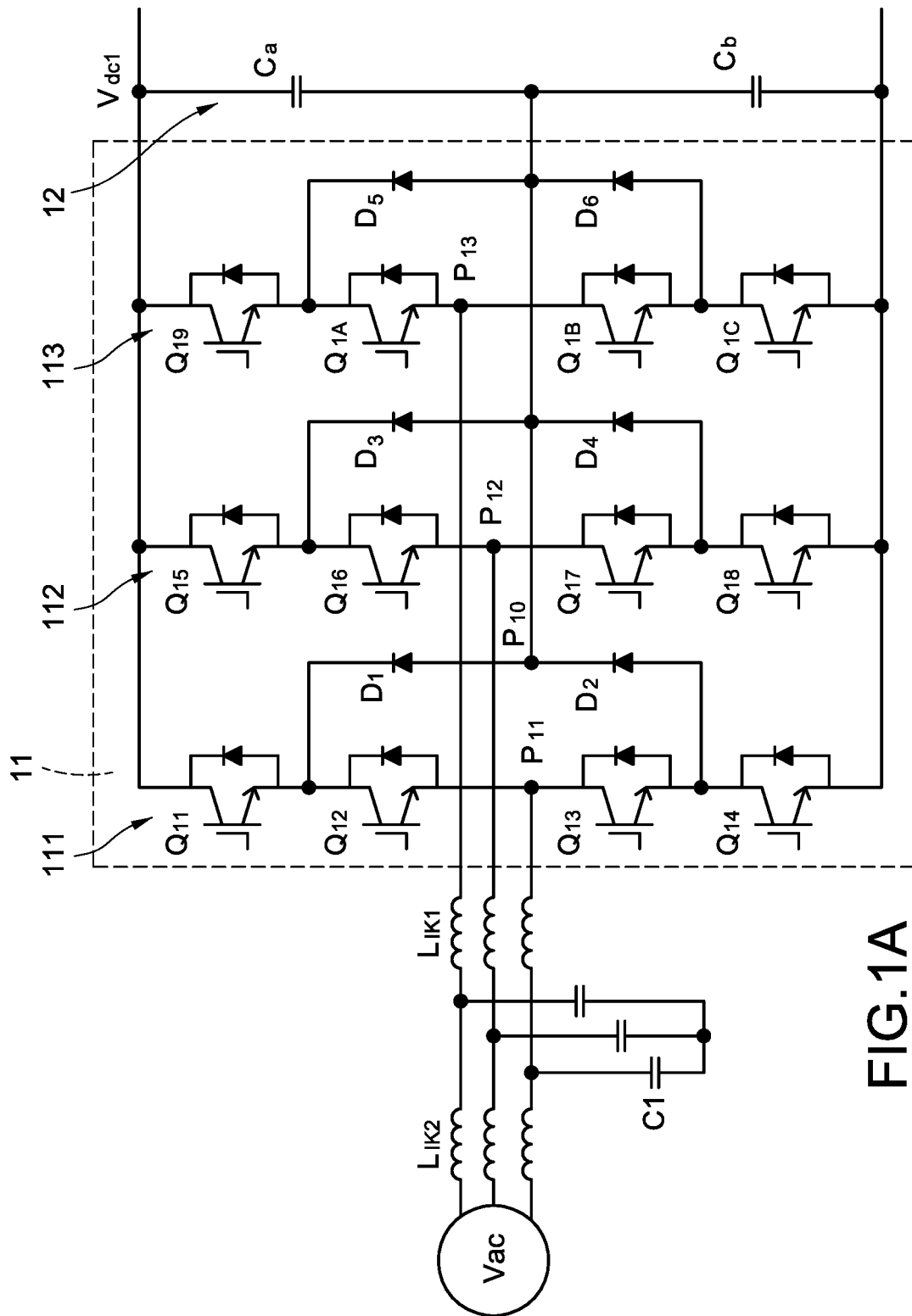
FIG. 1A is a circuit diagram of a first portion of a three-phase power apparatus with bidirectional power conversion according to the present disclosure.

Reference will now be made to the drawing figures to describe the present disclosure in detail. It will be understood that the drawing figures and exemplified embodiments of present disclosure are not limited to the details thereof.

Figure 1B:
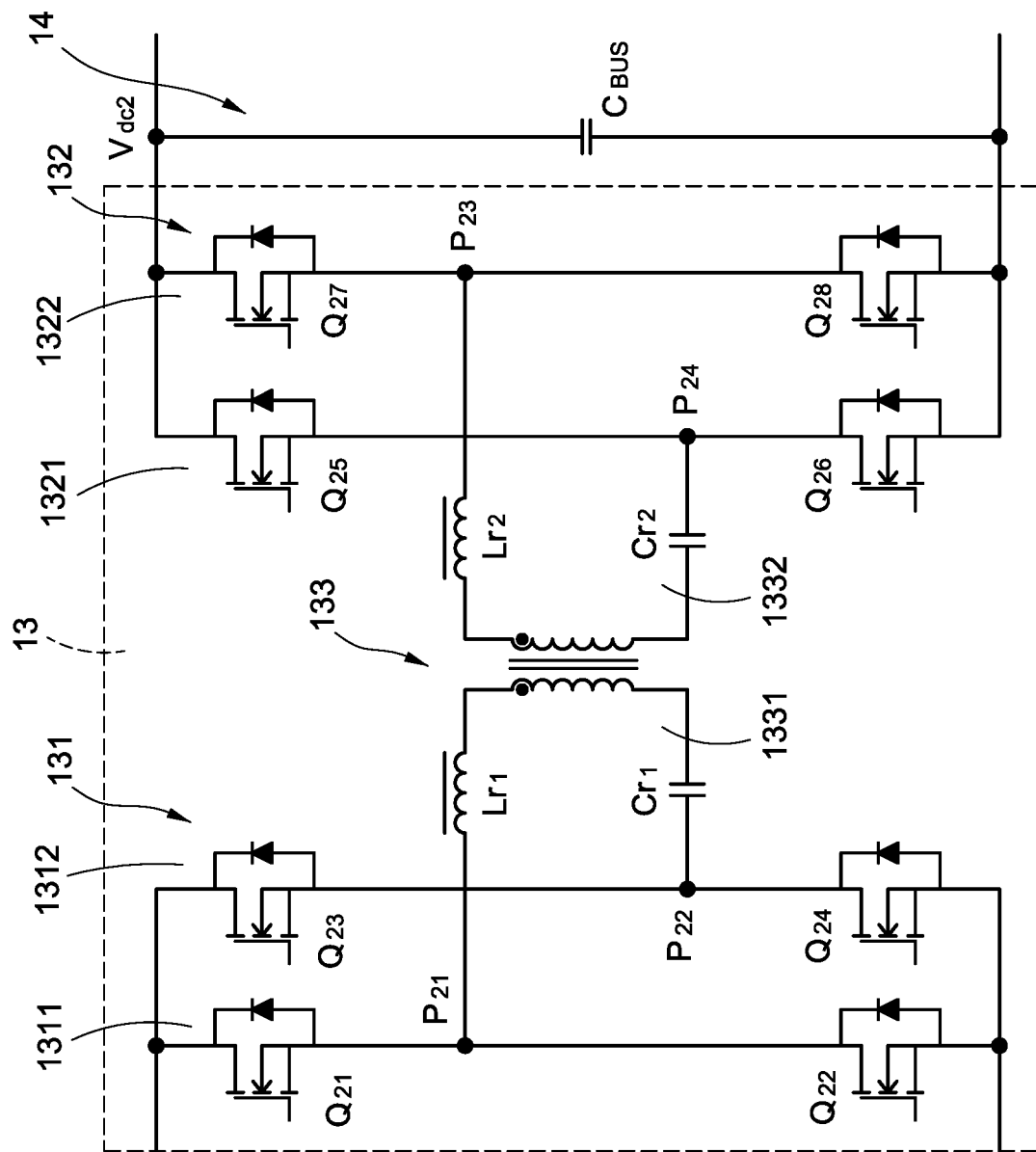
FIG. 1B is a circuit diagram of a second portion of the three-phase power apparatus with bidirectional power conversion according to the present disclosure.
Figure 1C:
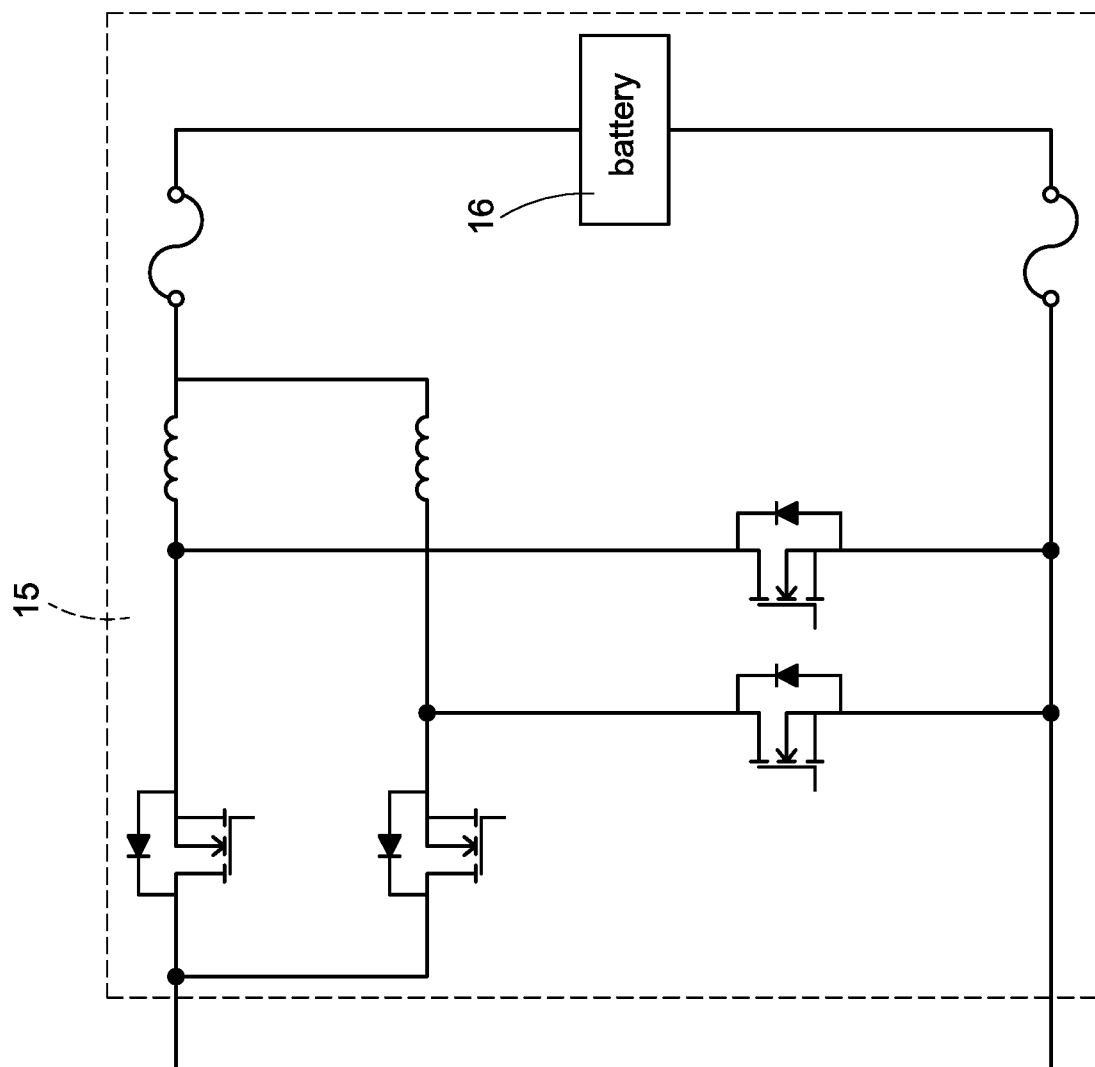
FIG. 1C is a circuit diagram of a third portion of the three-phase power apparatus with bidirectional power conversion according to the present disclosure.

Please refer to FIG. 1 composed of FIG. 1A, FIG. 1B, and FIG. 1C due to the limitation of the size of the drawing, which shows a circuit diagram of a three-phase power apparatus with bidirectional power conversion according to the present disclosure. The three-phase power apparatus with bidirectional power conversion is applied to electric vehicle (EV) charging. A battery 16 shown in FIG. 1C is a rechargeable battery inside the electric vehicle. The three-phase power apparatus includes an AC-to-DC conversion unit 11, a first DC bus 12, a first DC-to-DC conversion unit 13, a second DC bus 14, and a second DC-to-DC conversion unit 15.

The AC-to-DC conversion unit 11 shown in FIG. 1A has a first bridge arm 111, a second bridge arm 112, and a third bridge arm 113. A first side of the AC-to-DC conversion unit 11 is coupled to an AC mains Vac. In the present disclosure, the AC mains Vac may be a three-phase power source or an AC grid.

The first bridge arm 111 has two series-connected power switches $Q_{11},Q_{12}$ and a diode $D_1$ commonly connected to the power switches $Q_{11},Q_{12}$, and two series-connected power switches $Q_{13},Q_{14}$ and a diode $D_2$ commonly connected to the power switches $Q_{13},Q_{14}$. The power switch $Q_{12}$ is coupled to the power switch $Q_{13}$ and commonly connected at a first contact $P_{11}$, and the diode $D_1$ is coupled to the $D_2$ and commonly connected at a potential neutral point $P_{10}$. The power switches $Q_{11}$-$Q_{14}$ may be IGBTs or MOSFETs.

The second bridge arm 112 has two series-connected power switches $Q_{15},Q_{16}$ and a diode $D_3$ commonly connected to the power switches $Q_{15},Q_{16}$, and two series-connected power switches $Q_{17},Q_{18}$ and a diode $D_4$ commonly connected to the power switches $Q_{17},Q_{18}$. The power switch $Q_{16}$ is coupled to the power switch $Q_{17}$ and commonly connected at a second contact $P_{12}$, and the diode $D_3$ is coupled to the $D_4$ and commonly connected at the potential neutral point $P_{10}$. The power switches $Q_{15}$-$Q_{18}$ may be IGBTs or MOSFETs.

The third bridge arm 113 has two series-connected power switches $Q_{19},Q_{1A}$ and a diode $D_5$ commonly connected to the power switches $Q_{19},Q_{1A}$, and two series-connected power switches $Q_{1B},Q_{1C}$ and a diode $D_6$ commonly connected to the power switches $Q_{1B},Q_{1C}$. The power switch $Q_{1A}$ is coupled to the power switch $Q_{1B}$ and commonly connected at a third contact $P_{13}$, and the diode $D_5$ is coupled to the $D_6$ and commonly connected at the potential neutral point $P_{10}$. The power switches $Q_{19}$-$Q_{1C}$ may be IGBTs or MOSFETs.

In particular, each bridge arm is a three-level bridge arm and each bridge arm can control to output three voltage levels, thereby reducing switch stress and reducing harmonics. The first contact $P_{11}$, the second contact $P_{12}$, and the third contact $P_{13}$ are correspondingly coupled to each phase of the three-phase AC mains Vac. Since batteries of electric vehicles have a tendency to become increasingly high voltage and high capacity, the three-level AC-to-DC conversion unit 11 is selected and used to reduce switch stress, and which helps to avoid the use of switch components with high withstand voltage and high cost when the first DC bus 12 establishes a higher voltage. Moreover, that is to help reduce harmonics when the three-level AC-to-DC conversion unit 11 is connected to the AC grid.

The first DC bus 12 is coupled to a second side of the AC-to-DC conversion unit 11, and provides a first DC voltage $V_{dc1}$. The first DC voltage $V_{dc1}$ is across two capacitors Ca,Cb connected at the potential neutral point $P_{10}$ to provide the required voltage source for the rear-stage conversion unit.

The first DC-to-DC conversion unit 13 shown in FIG. 1B has a first bridge arm assembly 131, a second bridge arm assembly 132, an isolated transformer 133, and a resonant tank. The isolated transformer 133 has a primary side 1331 and a secondary side 1332. The primary side 1331 of the isolated transformer 133 has an inductance-capacitance (LC) resonant tank, and the first DC-to-DC conversion unit 13 is in an open-loop operation and operates at a resonant frequency point. In another embodiment, the secondary side 1332 of the isolated transformer 133 has an LC resonant tank. Therefore, the first DC-to-DC conversion unit 13 may have the symmetrical circuit in both forward operation and reverse operation, or the secondary side has only capacitance. Accordingly, the resonant tank is configured according to different loadings and loading ranges to optimize the control thereof.

The first bridge arm assembly 131 is coupled between the first DC bus 12 and the primary side 1331 of the isolated transformer 133, and has a first bridge arm 1311 and a second bridge arm 1312. The first bridge arm 1311 has two series-connected power switches $Q_{21}, Q_{22}$ commonly connected at a fourth contact $P_{21}$. The second bridge arm 1312 has two series-connected power switches $Q_{23}, Q_{24}$ commonly connected at a fifth contact $P_{22}$. The fourth contact $P_{21}$ and the fifth contact $P_{22}$ are connected to two ends of the primary side 1331, respectively.

The second bridge arm assembly 132 is coupled to the secondary side 1332 of the isolated transformer 133, and has a first bridge arm 1321 and a second bridge arm 1322. The first bridge arm 1321 has two series-connected power switches $Q_{25}, Q_{26}$ commonly connected at a sixth contact $P_{23}$. The second bridge arm 1322 has two series-connected power switches $Q_{27}, Q_{28}$ commonly connected at a seventh contact $P_{24}$. The sixth contact $P_{23}$ and the seventh contact $P_{24}$ are connected to two ends of the secondary side 1332, respectively.

The second DC bus 14 is coupled to the second bridge arm 1322 of the second bridge arm assembly 132, and provides a second DC voltage $V_{dc2}$. The second DC voltage $V_{dc2}$ is across a capacitor $C_{BUS}$.

A first side of the second DC-to-DC conversion unit 15 shown in FIG. 1C is coupled to the second DC bus 14 and a second side of the second DC-to-DC conversion unit 15 is coupled to the battery 16. The second DC-to-DC conversion unit 15 may use a non-isolated conversion circuit.

In particular, a DC-to-DC resonant conversion circuit is formed by the first bridge arm assembly 131, the second bridge arm assembly 132, the isolated transformer 133, and the resonant tank of the first DC-to-DC conversion unit 13. The operation principle of the general resonant conversion circuit is to control the switching frequency of switches of each bridge arm by feedback of the output voltage, thereby controlling the output voltage. However, in the application of charging electric vehicles, the variation range of the switching frequency of the resonant converter circuit is wide due to the large variation range of the battery voltage. Further, special resonant parameters need to be designed in order to meet the adjustment of the full-range voltage. Therefore, the switching frequency is usually too far from the resonant frequency point and the overall efficiency will decrease. The first DC-to-DC conversion unit 13 is in an open-loop operation and operates at a resonant frequency point so that the optimized efficiency of the first DC-to-DC conversion unit 13 can be maintained and further an electrical isolation can be achieved. Afterward, the second DC-to-DC conversion unit 15 is provided to charge the battery 16. Accordingly, the efficacy of high efficiency, wide range, and electrical isolation can be achieved.

In addition, the first DC voltage $V_{dc1}$ or the second DC voltage $V_{dc2}$ may be dynamically adjusted according to real-time conversion efficiency, component temperature, or battery voltage. For example, since battery 16 has a voltage variation during charging and discharging thereof, the first DC voltage $V_{dc1}$ or the second DC voltage $V_{dc2}$ may be dynamically adjusted according to the battery voltage. Further, the first DC voltage $V_{dc1}$ or the second DC voltage $V_{dc2}$ may be dynamically adjusted according to temperatures of power switches of the first DC-to-DC conversion unit 13 and the second DC-to-DC conversion unit 15. In other words, the first DC voltage $V_{dc1}$ or the second DC voltage $V_{dc2}$ does not have to maintain a fixed voltage and can be dynamically adjusted to optimize efficiency.

Hereinafter, the operation of the three-phase power apparatus with bidirectional power conversion will be described. The three-phase power apparatus of the present disclosure has operation modes of a bidirectional power flow. The operation modes of the bidirectional power flow has an energy-storing mode (also referred to as a forward operation) and an energy-releasing mode (also referred to as a reverse operation). The forward operation means that the power apparatus receives the AC mains Vac, and the AC mains Vac is converted into a DC power source for the battery 16 by the AC-to-DC conversion unit 11, the first DC-to-DC conversion unit 13, and the second DC-to-DC conversion unit 15. The specific application may be, for example but not limited to, the power supplied by the AC grid to supply to the charging station to charge the electric vehicles.

On the contrary, the reverse operation means the DC power source is converted into the AC mains Vac by the second DC-to-DC conversion unit 15, the first DC-to-DC conversion unit 13, and the AC-to-DC conversion unit 11. The specific application may be, for example, but not limited to, the excess power outputted from the battery 16 as the DC power source for compensation of regional peak power demand, adjustment of power supply quality, and even transaction to the AC grid, such as an electric power company.

In one embodiment of the present disclosure, the AC-to-DC conversion unit 11 is a three-level converter. When the power flow direction of the three-phase power apparatus is from the AC mains Vac to the battery 16, the AC-to-DC conversion unit 11 provides a three-level control for power factor correction of the AC mains Vac to provide the stable first DC voltage $V_{dc1}$. On the contrary, when the power flow direction of the three-phase power apparatus is from the battery 16 to the AC mains Vac, the AC-to-DC conversion unit 11 provides a three-level control for controlling the AC-to-DC conversion unit 11 in a current mode control to reversely provide electrical energy to the AC mains Vac, i.e., for controlling to output current from the second side of the AC-to-DC conversion unit 11 to the first side of the AC-to-DC conversion unit 11. At this condition, the AC-to-DC conversion unit 11 plays a role of an inverter to provide real (active) power or reactive power according to the requirements of the AC grid.

Moreover, when the power flow direction of the three-phase power apparatus is from the AC mains Vac to the battery 16, the second DC-to-DC conversion unit 15 plays a role of a DC step-down (buck) converter to charge the battery 16. On the contrary, when the power flow direction of the three-phase power apparatus is from the battery 16 to the AC mains Vac, the second DC-to-DC conversion unit 15 plays a role of a DC step-up (boost) converter.

Moreover, when the power flow direction of the three-phase power apparatus is delivered from the battery 16 and in a standalone operation, the AC-to-DC conversion unit 11 provides a three-level control for providing a voltage source to other AC loads in a voltage mode control.

In conclusion, the present disclosure has following features and advantages:

1. The voltage of the first DC bus 12 and the voltage of the second DC bus 14 can be dynamically adjusted to optimize efficiency according to the demand of efficiency or the demand of temperature.

2. In order to respond to the voltage of the battery 16, such as the battery of the electric vehicle is wide-range, the second DC-to-DC conversion unit 15 can be designed to easily achieve a voltage output with wide range.

3. The AC-to-DC conversion unit 11 preferably uses a three-level converter so as to reduce the stress of the switches, help to eliminate the use of switch components with high withstand voltage and high cost when the first DC bus 12 establishes a higher voltage, and help to reduce harmonics when connecting to the AC grid.

4. The primary side 1331 or the secondary side 1332 of the isolated transformer 133 may be configured with the resonant tank according to different loads and ranges so that the control is more optimized.

5. The first DC-to-DC conversion unit 13 is in an open-loop operation and operates at a resonant frequency point so that the efficiency of the first DC-to-DC conversion unit 13 can be optimized and the effect of electrical isolation can be achieved, and the second DC-to-DC conversion unit 15 is utilized to charge the battery 16, and therefore the efficacy of high efficiency, wide range, and electrical isolation can be achieved.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A three-phase power apparatus with bidirectional power conversion applied to a battery of an electric vehicle, the three-phase power apparatus comprising:
    an AC-to-DC conversion unit having a first bridge arm, a second bridge arm, and a third bridge arm, a first side of the AC-to-DC conversion unit coupled to an AC mains,
    a first DC bus coupled to a second side of the AC-to-DC conversion unit, and having a first DC voltage,
    a first DC-to-DC conversion unit comprising:
        an isolated transformer having a primary side and a secondary side,
        a first bridge arm assembly coupled to the first DC bus in parallel and the primary side, the first bridge arm assembly having a first bridge arm and a second bridge arm connected in parallel, wherein the first bridge arm comprises a first power switch and a second power switch connected in series, and the second bridge arm comprises a third power switch and a fourth power switch connected in series, and
        a second bridge arm assembly coupled to the secondary side, the second bridge arm assembly having a first bridge arm and a second bridge arm connected in parallel, wherein the first bridge arm comprises a fifth power switch and a sixth power switch connected in series, and the second bridge arm comprises a seventh power switch and an eighth power switch connected in series,
    a second DC bus coupled to the second bridge arm of the second bridge arm assembly in parallel, and having a second DC voltage, and
    a second DC-to-DC conversion unit having a plurality of power switches coupled to the second DC bus in parallel, a first side of the second DC-to-DC conversion unit coupled to the second DC bus and a second side of the second DC-to-DC conversion unit coupled to the battery,
    wherein the primary side and/or the secondary side of the isolated transformer has a resonant tank, and the first DC-to-DC conversion unit is in an open-loop operation and operates at a resonant frequency point;
    wherein the first DC voltage of the first DC bus and the second DC voltage of the second DC bus are dynamically adjusted according to temperatures of the first to eighth power switches of the first DC-to-DC conversion unit and temperatures of the power switches of the second DC-to-DC conversion unit.

2. The three-phase power apparatus with bidirectional power conversion in claim 1, wherein the second DC-to-DC conversion unit is a non-isolated conversion circuit.

3. The three-phase power apparatus with bidirectional power conversion in claim 1, wherein the AC-to-DC conversion unit is a three-level converter; when a power flow direction of the three-phase power apparatus is from the AC mains to the battery.

4. The three-phase power apparatus with bidirectional power conversion in claim 1, wherein when a power flow direction of the three-phase power apparatus is from the battery to the AC mains, the AC-to-DC conversion unit is controlled in a three-level manner.

5. The three-phase power apparatus with bidirectional power conversion in claim 1, wherein when a power flow direction of the three-phase power apparatus is from the AC mains to the battery.

6. The three-phase power apparatus with bidirectional power conversion in claim 1, wherein when a power flow direction of the three-phase power apparatus is from the battery to the AC mains.

7. The three-phase power apparatus with bidirectional power conversion in claim 1, wherein when a power flow direction of the three-phase power apparatus is delivered from the battery and in a standalone operation, the AC-to-DC conversion unit is controlled in a three-level manner.

8. The three-phase power apparatus with bidirectional power conversion in claim 1, wherein
    the first bridge arm of the AC-to-DC conversion unit comprises a first power switch, a second power switch connected to the first power switch in series, and a first diode coupled to a common contact connected between the first power switch and the second power switch, and comprises a third power switch, a fourth power switch connected to the third power switch in series, and a second diode coupled to a common contact connected between the third power switch and the fourth power switch; the second power switch is coupled to the third power switch and commonly connected at a first contact, and the first diode is coupled to the second diode and commonly connected at a potential neutral point;
    the second bridge arm of the AC-to-DC conversion unit comprises a fifth power switch, a sixth power switch connected to the fifth power switch in series, and a third diode coupled to a common contact connected between the fifth power switch and the sixth power switch, and comprises a seventh power switch, an eighth power switch connected to the seventh power switch in series, and a fourth diode coupled to a common contact connected between the seventh power switch and the eighth power switch; the sixth power switch is coupled to the seventh power switch and commonly connected at a second contact, and the third diode is coupled to the fourth diode and commonly connected at the potential neutral point; and the third bridge arm of the AC-to-DC conversion unit comprises a ninth power switch, a tenth power switch connected to the ninth power switch in series, and a fifth diode coupled to a common contact connected between the ninth power switch and the tenth power switch, and comprises an eleventh power switch, a twelfth power switch connected to the eleventh power switch in series, and a sixth diode coupled to a common contact connected between the eleventh power switch and the twelfth power switch; the tenth power switch is coupled to the eleventh power switch and commonly connected at a third contact, and the fifth diode is coupled to the sixth diode and commonly connected at the potential neutral point.

9. The three-phase power apparatus with bidirectional power conversion in claim 1, wherein the first power switch and the second power switch are commonly connected at a fourth contact, the third power switch and the fourth power switch are commonly connected at a fifth contact, wherein the fourth contact and the fifth contact are respectively coupled to two ends of the primary side, the fifth power switch and the sixth power switch are commonly connected at a sixth contact, and the seventh power switch and the eighth power switch are commonly connected at a seventh contact, wherein the sixth contact and the seventh contact are respectively coupled to two ends of the secondary side.

* * * * *